United States Patent

[11] 3,577,736

| [72] | Inventor | Emerson W. Stevens<br>Snyder, N.Y. |
|---|---|---|
| [21] | Appl. No. | 852,010 |
| [22] | Filed | Aug. 21, 1969 |
| [45] | Patented | May 4, 1971 |
| [73] | Assignee | The United States of America as represented by the Secretary of the Air Force |

[54] THRUST DIVERTER VALVE
8 Claims, 9 Drawing Figs.

[52] U.S. Cl. .................................................. 60/226,
60/230, 244/52, 244/23
[51] Int. Cl. ................................................... F02k 1/20
[50] Field of Search ....................................... 60/230,
226; 244/52, 23; 137/610

[56] References Cited
UNITED STATES PATENTS

| 2,774,554 | 12/1956 | Ashwood.................. | 244/23 |
| 2,912,188 | 11/1959 | Singelmann............. | 60/226X |
| 3,112,616 | 12/1963 | Adamson.................. | 244/52X |
| 3,244,190 | 12/1965 | Eckert...................... | 60/230 |
| 3,280,560 | 10/1966 | Marchant................. | 60/226 |
| 3,290,885 | 12/1966 | Thomas.................... | 60/226 |

*Primary Examiner*—Clarence R. Gordon
*Attorneys*—Harry A. Herbert, Jr. and Charles H. Wagner ABSTRACT: A thrust diverter valve for turbofan jet engines producing two different angular flow patterns for the fan exhaust from a turbofan jet engine, which includes two similar spherical curved portions of half of a split substantially hemispherical shell which are concentrically rotatable in opposite directions in a confining chamber around the axis of a turbofan jet engine with the axis of rotation of each portion of the shell disposed in canted relation with respect to horizontal and vertical flow directions. The spherical shell portions are rotatable about their axis in opposite directions into one position in the path of flow from the fan to form an inclined hemispherical deflector shell and deflect the flow from the fan downwardly at substantially 90° to the fan axis for vertical thrust, and movable about their axis in the opposite directions out of the flow path from the fan and allow the fan flow to pass between the spherical shell portions parallel to the axis of the turbofan jet, without deflection, to provide for horizontal thrust.

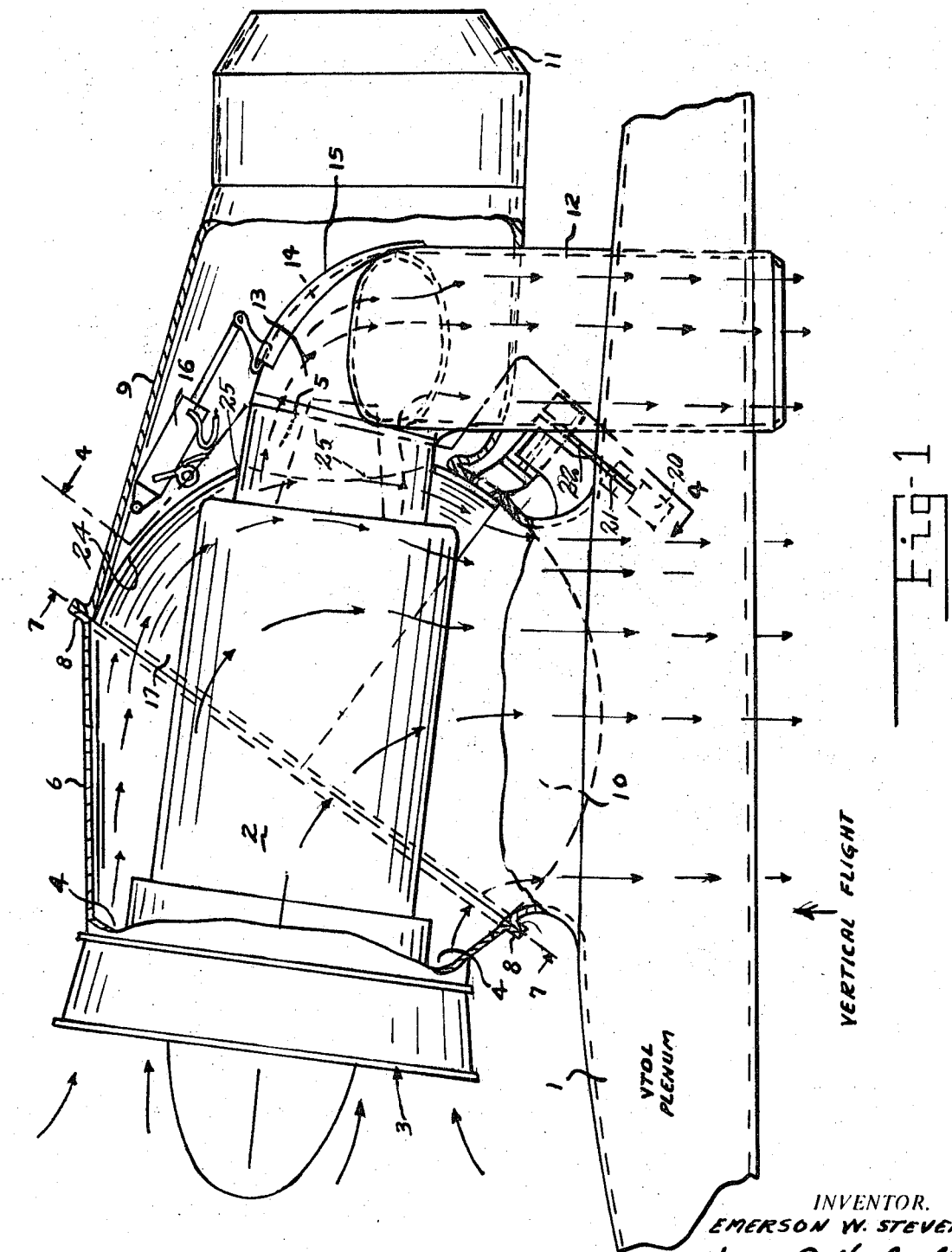

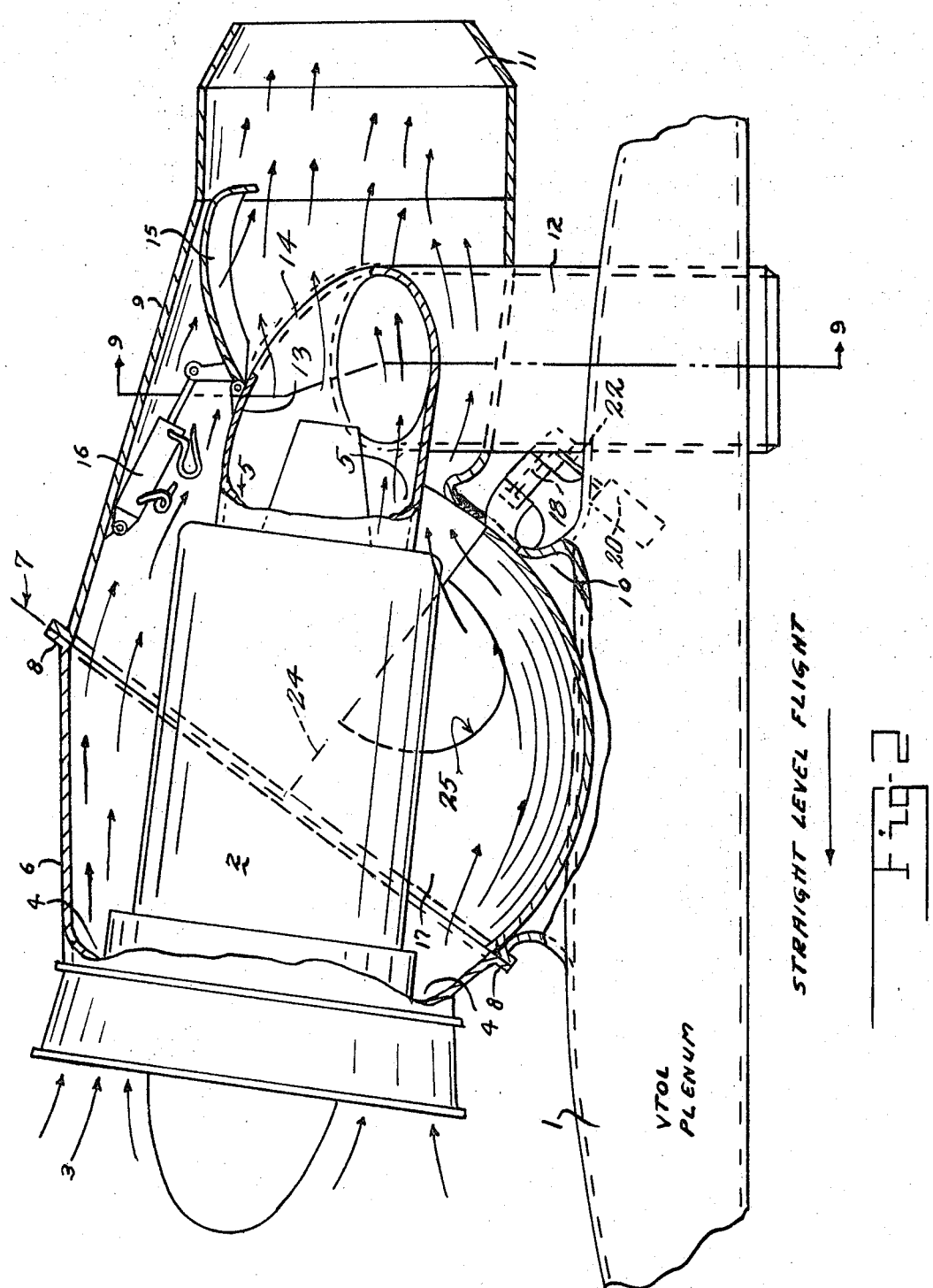

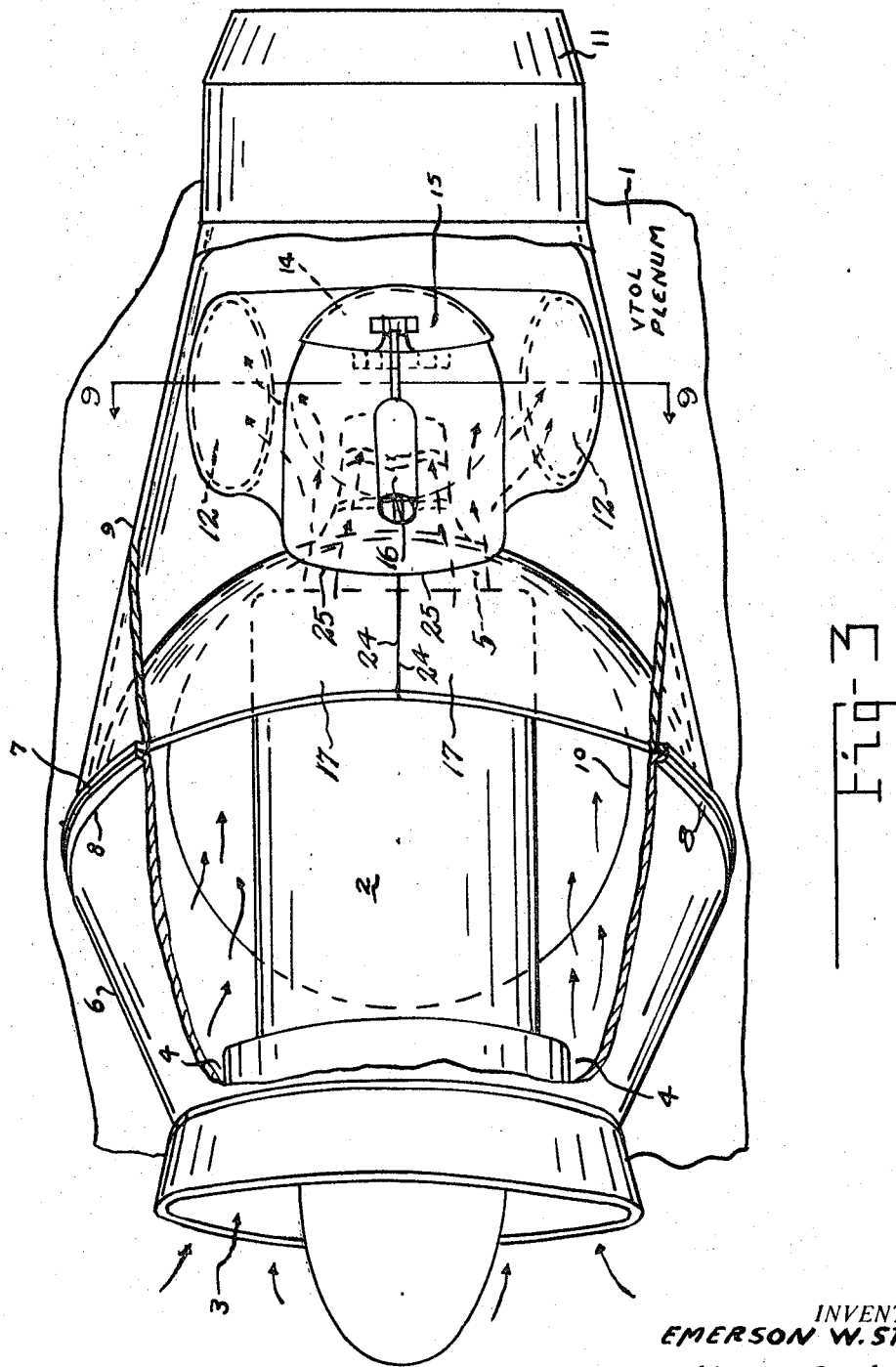

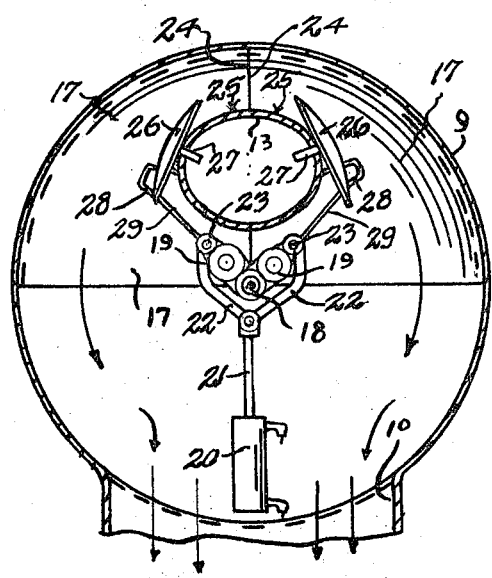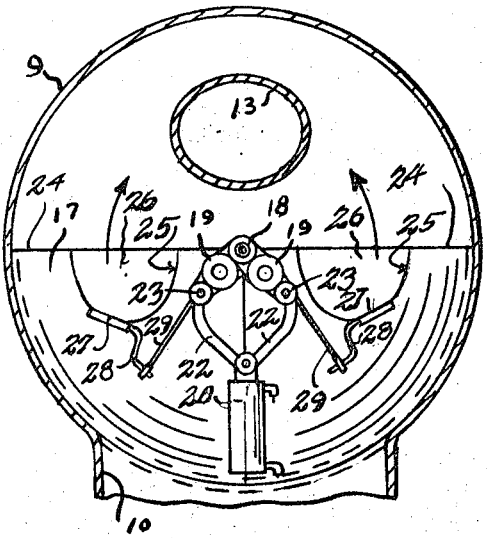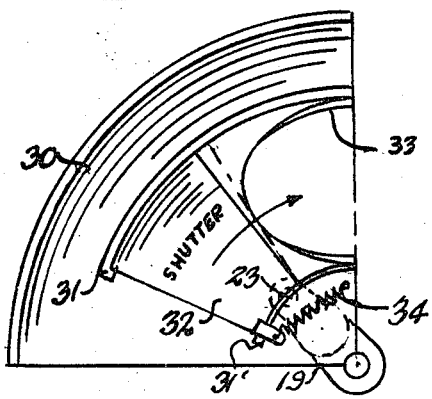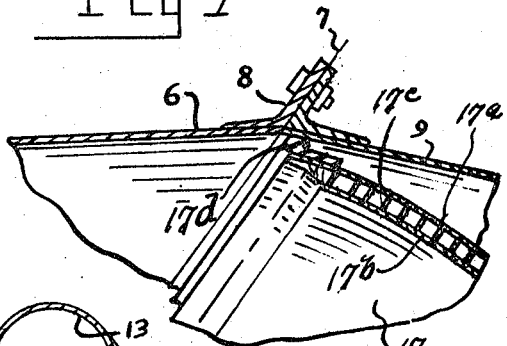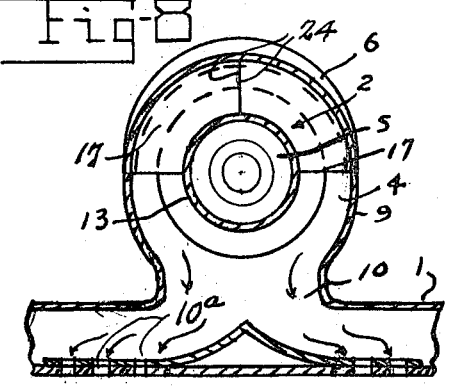

3,577,736

THRUST DIVERTER VALVE

BACKGROUND OF THE INVENTION

Development in V/STOL and VTOL aircraft technology over the past 15 years or more has exploited various means for producing thrust for powered lift in the critical V/STOL flight mode. The basic thrust in general has been achieved by either shaft- or gas-driven rotating lift devices, such as rotators, props, and fans or combinations of direct-lift engines and diverted-lift/cruise engines.

SUMMARY OF THE INVENTION

This invention provides new and novel concepts of thrust diversion which are applicable to V/STOL technology, and is based upon the utilization of bypass air of turbofan jet engines.

The invention provides means for selectively directing the thrust of the fan of the turbofan jet engine, or engines, as well as the jet thrust of the engine, downwardly for vertical or substantially vertical lift and takeoff or directing the thrust of the fan, as well as the jet exhaust, rearwardly for forward flight or thrust.

The invention utilizes a pair of segmental spherical shell deflector members disposed in a casing in back of the fan discharge or "blast" of a turbofan jet engine in which the spherical deflector members are movable in an arc about a common inclined axis to an upper position to direct the blast of the fan jet downwardly for vertical thrust or VTOL, and the deflector members are swingable downwardly out of the path of the fan thrust, and block any downward blast of the engine fan while allowing the blast or thrust from the fan to pass rearwardly or horizontally without a material obstruction, to provide forward thrust.

The spherical segmental deflector shells or diverters are each provided with a substantially semicircular opening in their abutting edges to receive and accommodate therein the rearwardly extending turbojet exhaust conduit from the engine, when the shells are swung into their upper or thrust-diverting position.

Closure means are provided for closing these openings when the shells are swung downwardly out of the path of the fan discharge or thrust.

The turbofan jet engine discharge means includes an exhaust conduit or conduits from the jet discharge opening of the engine which direct the jet or exhaust of the engine downwardly for vertical lift or thrust and may be provided with an openable closure or door in the rear portion thereof which can be opened for forward thrust or flight to allow the jet discharge from the engine to discharge rearwardly to augment the forward thrust from the fan when the spherical shells or segments are swung downwardly out of the path of discharge or thrust from the fan element of the turbofan engine.

The arrangement is applicable to V/STOL aircraft in which a supporting airfoil plenum or wing structure is provided with closable downwardly discharging jet openings or slots in its lower surface in which the discharged air and engine exhaust from a turbofan jet engine is deflected downwardly into this wing structure or plenum, so as to be discharged downwardly through these openings or slots to provide the vertical upward thrust or lift. These openings are preferably closed when the thrust from the turbofan is directed rearwardly during normal or conventional forward flight to provide a supporting airfoil like any normal wing structure at that time.

BRIEF DESCRIPTION OF THE DRAWINGS

Like reference characters refer to like parts in the several FIGS. of the drawings in which:

FIG. 1 is a somewhat schematic and fragmental side view, parts being broken away and shown in section to schematically show a turbofan jet engine or aircraft propulsion unit incorporating the V/STOL invention and illustrating the structure and parts adjusted for vertical lift or thrust, such as for vertical takeoff or landing, the arrows illustrating generally the direction of fan and jet discharge under the circumstances.

FIG. 2 is a view, somewhat similar to FIG. 1, but showing the thrust diverter valve segments and parts in section, and in the position for horizontal flight or forward thrust.

FIG. 3 is a somewhat diagrammatic or schematic top plan view, parts being broken away, with the diverter valve or spherical deflector shells in the positions shown in FIG. 1, in position for vertical takeoff or landing, parts of the plenum or wing structure being broken away.

FIG. 4 is a fragmentary sectional view, taken about on the plane indicated by line 4—4 in FIG. 1, looking in the direction of the arrows and showing the parts in their VTOL positions.

FIG. 5 is a sectional view somewhat similar to FIG. 4, but showing the diverter shells swung to positions for forward thrust or flight.

FIG. 6 is a detail side view of one of the segmental deflector or diverter shell quadrants, showing a modified form of closure for the semicircular recess that receives the rearwardly extending portion of the downwardly extending jet discharge conduit when the segmental deflector shells are in their VTOL positions, as shown in FIGS. 1 and 4.

FIG. 7 is a fragmentary detail sectional view, showing a portion of the outer or peripheral edge portion of one of the thrust diverter shells and a flexible sealing means between the same and the interior of the enclosing casing.

FIG. 8 is a detail sectional view of the surrounding outer casing or housing, illustrating the lower circular opening therein in open communication with the interior of the plenum or hollow wing structure, with the two segmental diverter shells raised into the VTOL positions.

FIG. 9 is a detail sectional view, taken about on the plane indicated by line 9—9 in FIG. 2, but with the engine parts omitted.

Referring to the drawings, the reference numeral 1 denotes a portion of an aircraft structure, which may be an airfoil, wing or plenum for receiving the turbofan exhaust from a turbofan jet engine 2 during VTOL (vertical takeoff and landing).

The airfoil or plenum 1 as indicated in FIGS. 8 and 9 is provided with suitable exhaust openings 10a in its lower surface for directing the air discharged therein in a downward direction as indicated by the arrows. These openings are preferably provided with suitable closures so as to be closed during normal level and forward flight to provide a smooth airfoil surface.

The turbofan jet unit 2 is somewhat conventional and schematically shown, comprising the usual air intake 3 which admits a central air column into the turbine 2, and admits the surrounding air column into the turbofan. Air from the turbofan unit is discharged rearwardly at 4 while the turbojet exhaust is indicated at 5.

A suitable circular housing or casing 6 expands rearwardly around the turbofan unit 2 from the periphery of the fan intake and terminates in an inclined plane indicated at 7, with an annular flange 8 to which is connected the rearwardly extending annular discharge housing or chamber 9.

The lower or bottom portion of the chamber or housing 9 is formed with an enlarged lower circular discharge opening 10 leading downwardly into the plenum or supporting wing structure 1 to receive all of the air discharged from the turbofan, during vertical takeoff and landing (VTOL).

The casing 9 extends rearwardly as shown in FIGS. 1 to 3 and terminates in an annular discharge opening 11 for passing the discharged turbofan air therethrough during normal forward flight of an aircraft. This opening 11 may also provide for the discharge of the turbojet exhaust during normal forward flight, as shown in FIG. 2.

Downwardly extending exhaust conduits, indicated at 12, curve forwardly at their upper portions into a rearwardly extending turbojet exhaust pipe or conduit 13 from the engine, which may be formed with an exhaust or discharge opening or port 14 in its rearwall and is initially closed by an openable closure or cover 15 to direct all of the jet exhaust downwardly into the conduit 12 during VTOL when closed, or allow a major portion of this exhaust to pass rearwardly without changing the direction of the forward thrust of the engine 2 during normal level or forward movement, or flight. In vertical flight, or lift (VTOL), the closure 15 may be swung to closed position as shown in FIG. 1 by any suitable means 16, such as a hydraulic or electric motor of conventional type.

The means for opening the large circular horizontal opening 10 and deflecting the fan thrust or exhaust from the engine downwardly, for vertical thrust (VTOL), while substantially obstructing the fan discharge passage through the housing 9 to the outlet 11 comprises a pair of segmental spherical thrust diverter shells or valves 17.

These segmental air thrust diverter shells 17 are pivoted on a common inclined axis 18, as seen in FIGS. 4 and 5, by suitable supporting brackets 19, and the shells 17 are swingable about this inclined axis 18 between the diverting position, as shown in FIGS. 1 and 4, to form a hemispherical thrust deflector shell surrounding the jet exhaust to close, or block, the discharge through the opening 11 at the rear end of the casing 9.

Any suitable actuating means may be provided for remote control to swing the shell segments 17 between their downward deflecting position, as shown in FIGS. 1, 3, 4 and 7, and their discharge "passing" positions, closing the circular horizontal opening 10 which is used for vertical lift, as shown in FIGS. 2 and 5. For instance, an actuator may be used comprising a remote control hydraulic or electric motor 20 which actuates a stem 21 that is connected to a pair of links 22 which are pivoted at 23 to the shells 17 in offset relation to the pivotal axis 18.

The diverter valve curved segments 17 are preferably spherical shells, each being about substantially a one-eighth segment of a sphere. The edges 24 are moved into abutting relation when the shells are swung to their upper or thrust diverting positions as seen in FIGS. 1, 3 and 4. These abutting edges 24 are formed with substantially semicircular recesses 25 or openings, best seen in FIGS. 4 and 5, for receiving and accommodating the horizontal portion of the jet exhaust conduit 13.

Suitable closure plates 26 may be provided, which are hinged to the diverter shells 17 at 27 (see FIGS. 4 and 5), and any suitable means may be provided for moving the plates 26 out of the opening and out of the way of the exhaust conduit 13 as the shells are moved upwardly to VTOL or vertical thrust relation, and returning the plates into the openings 25 as the segments 17 are returned to forward thrust position as shown in FIG. 5. For instance, cranks 28 may be provided, which may be fixed to the shells 17 on their pivotal axes, and links 29 provided or connected between the links 22 and the cranks 28, or a suitable camming means may be provided to cam the plates out of the way as they are raised with return springs.

Referring to the modification in FIG. 6 which shows one of the one-eighth spherical diverter valve shells or segments, indicated at 30, the interior of the shell may be provided with curved guide ways or tracks 31, 31', and a spherically curved "shutter" plate 32 is slidably mounted on these tracks 31, 31' for movement across the semicircular exhaust conduit receiving opening 33 to close the same by a suitable tension spring 34. In this modification, the opening 33 in the plate is normally closed by the plate 32 which conforms closely to the curvature of the thrust diverter segment.

As the segments 32 are moved to their VTOL positions, the exhaust conduit 13 strikes the edge of the plate 32 and cams or moves it to its open position, shown in FIG. 6, to permit the segments 30 to close to abutting relation around the jet exhaust conduit 13. Movement of the deflector shells downwardly, as shown by the arrows in FIG. 4, permits the opening 33 to be automatically closed by the shutters 32. The opening 10 leading down into the plenum 1 is, of course, closed automatically by the diverter segments, as schematically shown in FIG. 5, when the segments are swung downwardly into their abutting relation. The aforementioned closure plates 26 or the shutters 32 may be omitted by suitably orienting and/or locally distorting the lower discharge opening 10.

Referring to the detail view shown in FIG. 7, the segments 17 may be of reinforced construction having an outer spherical curvature or wall 17a and a closely spaced inner exhaust diverter wall 17b with suitable reinforcing structures 17c therebetween.

Means for sealing the space between the curved wall 9 of the chamber and the rim of the spherical diverter segments 17 is indicated at 17d, and may be suitable strips or "beads" of tough resilient packing material, such as Teflon, secured to the rim or edges of the diverter shells 17 and provided with an enlarged bead adapted to slide on the concentric smooth inner curved surface of the housing 9 as the diverter valves 17 are swung between their vertical and horizontal thrust control positions, shown in FIGS. 4 and 5.

Briefly describing the operation of the invention, when that vertical thrust or lift is desired, as in takeoff or landing of a VTOL or V/STOL turbofan jet engine equipped aircraft having a plenum chamber, as at 1 comprising the aircraft wing structure and having downwardly extending turbofan thrust discharge passages 10a in the lower surface thereof, the spherical diverter shells 17 may be initially disposed into their raised abutting positions, as shown in FIGS. 1, 3 and 6. Thereafter, the blast and thrust from the fan of the turbofan jet engine is diverted downwardly by the inner curved spherical surfaces of the said shells 17 through the opening 10 into the lower surface of the wing or plenum structure and passes out through the openings 10a thereof in a downward direction, exerting upward lift or thrust on the structure.

The jet exhaust from the turbojet of the engine 2 is directed into the exhaust conduit 13 and downwardly by the vertically connected conduits 12 to exert additional or supplemental vertical lift or thrust.

When the thrust diverter shells are swung downwardly to their abutting positions for effecting forward thrust, as seen in FIGS. 2 and 5, the blade segments 17 close the vertical opening 10 into the plenum so that the rearward fan discharge is not substantially disturbed since the segment 17 moves substantially out of the path of the airblast from the fan unit of the engine, thus providing complete forward thrust on the supporting structure from the fan.

In order to augment this major forward thrust from the fan unit of the engine with the jet exhaust from the engine, the pivoted closure 15 on the exhaust conduit from the combustion chamber (not shown) of the engine is raised away from the opening 14 in the back portion of the conduit 13, allowing this jet exhaust to pass, substantially horizontally without change in direction and out through the rear discharge opening or duct 11. Thus, the direction of forward thrust is not disturbed and augments the forward thrust from the fan unit of the turbofan jet engine to provide maximum forward thrust.

The bottom opening 10 into the plenum, during this forward thrust position, is of course closed by the outer surfaces of the abutting spherical diverter segment 17, also the openings in the bottom surface of the plenum or wing structure are also closed during forward thrust conditions by any suitable means, to provide a smooth dynamic airfoil surface for forward flight.

For purposes of exemplification, a particular embodiment of the invention has been shown and described to the best understanding thereof. However, it will be apparent that minor changes and modification, in the arrangement and construction of the parts thereof may be resorted to without departing from the true spirit and scope of the invention as defined in the accompanying claims.

I claim:

1. A thrust diverter valve means for turbofan jet engines comprising, an outer elongated annular housing adapted to receive and house a turbofan jet engine in the forward portion thereof, said housing having an annular engine intake opening in the forward end thereof and an exhaust discharge opening in its rear end in spaced relation to the rear of said engine for discharging the turbofan exhaust from said turbofan jet engine therethrough substantially concentric to the central axis of said engine to provide forward engine thrust, said housing having an enlarged bottom discharge opening in the lower side thereof opening substantially downward for discharging diverted turbofan jet discharge from said engine downwardly for providing upward lifting thrust, a pair of spherically curved thrust diverter valve segmental shells concentrically swingable in said casing in opposite directions about an appreciable upward and rearwardly inclined central axis through said housing above said bottom discharge opening, said shells each having an outer spherical convex curvature closely traversing the inner surface of said housing and an inner spherically curved concave surface facing the rear of said engine, and movable about said upward and rearwardly inclined axis from an upper abutting relation in the path of the fan discharge thrust from said engine and across said exhaust discharge opening, for blocking engine exhaust to said rear exhaust discharge opening to divert said fan discharge thrust downwardly through said bottom discharge opening to provide vertical lift, and swingable downwardly about said rearwardly inclined axis into a second abutting relation across said bottom opening to close the same, and move substantially out of the path of exhaust discharge from said engine to said rear exhaust discharge opening to allow substantially direct passage of engine discharge through the rear discharge opening of said housing, to provide forward thrust from said engine.

2. A turbofan jet engine thrust diverter structure including a turbofan jet engine having forward air intake and rear fan discharge and turbojet discharge openings, an annular casing extending rearwardly beyond the rear end of said engine having a rear turbofan jet discharge opening in the rear end thereof to provide rearward turbofan discharge and promote forward engine thrust on said structure, said annular casing having a downwardly extending turbofan discharge receiving opening in the lower side thereof for receiving downwardly diverted fan discharge thrust therethrough for exerting substantially vertical lift to said structure, thrust diverter means pivotally mounted in said casing on an upwardly and forwardly inclined axis behind said engine, intermediate the ends of said casing, for swinging movement about said axis between a first upper vertical thrust control position blocking the turbofan discharge from passing through said rear fan discharge opening in said casing and diverting said fan jet discharge downwardly through said downwardly extending fan jet discharge opening in said lower side of said casing, and a second lower forward thrust control position closing said downwardly extending opening in said lower side of said casing and opening the passage directly through said casing from said engine to provide forward turbofan jet engine thrust and interrupt vertical upward thrust on the structure, and means connected to said thrust diverter means for selectively moving said thrust diverter means between said positions, said annular casing intermediate said air intake and said rear fan discharge opening being enlarged and substantially spherical, and said thrust diverter means comprising a pair of similar spherical segmental shells mounted for swinging movement concentric to one radial edge thereof about said upwardly and forwardly inclined axis, said shell segments each having an inner concave spherical curvature facing toward the rear end of the turbofan jet engine, and an outer surface closely defining the inner substantially spherical curvature of the intermediate portion of said casing, said spherical thrust diverter shells each comprising substantially a one-eighth segment of a hollow sphere and swingable upwardly around said inclined axis toward each other into abutting relation in said casing in back of the fan jet engine to form a spherical quadrant of a hollow sphere inclined downwardly in front of said rear fan jet discharge opening of said casing to block fan discharge from said engine and divert the same downwardly through said downwardly extending opening to provide vertical lift, said shell segments being swingable downwardly about said inclined axis into abutting relation over said downwardly extending opening to close said last-mentioned opening and move substantially out of the discharge path of the turbofan toward said rear discharge opening of said casing to provide forward turbofan thrust from said engine.

3. Apparatus as set forth in claim 2, including means for simultaneously moving said shell segments about the inclined axis between the upper abutting thrust diverting position and said lower abutting position closing said downwardly extending opening.

4. A thrust diverter structure as defined in claim 3, in which said downwardly extending opening is opened by upward swinging movements of said spherical segments, and closed by downward swinging movement of said segments into edge-abutting relation, said downwardly extending opening of said casing being connected in communication with an interior airfoil supporting plenum structure incorporating a lower airfoil supporting surface having a plurality of downwardly extending discharge openings for directing turbofan thrust which is diverted through said downwardly extending opening in said casing in a downward direction, for exerting vertical lift on said structure.

5. A turbofan jet engine thrust diverter structure as set forth in claim 4, including a rearwardly and downwardly extending jet discharge conduit connected at its forward upper end to receive the turbojet exhaust from said engine, said discharge conduit extending axially and rearwardly in said casing between said segmental thrust deflector shells and then downwardly in a vertical direction and out of said casing for directing engine jet discharge thrust downwardly, to augment vertical lift, the edges of said segments being movable into abutting relation with each other when said segments are moved upwardly into thrust diverting position, said edges having cutout openings formed therein to receive and accommodate said jet exhaust conduit, directly behind said engine.

6. Apparatus as set forth in claim 5, including spherically curved closure plates for said edge openings carried by said segmental shells and movable into said cutout openings in said segment to close the same incident to movement of said segments from their upper thrust directing position to their lower abutting positions, closing said downwardly extending opening in said casing.

7. A turbofan jet engine thrust diverter structure as defined in claim 6 in which said jet discharge conduit from said engine is formed with a jet exhaust port therein facing toward said rear discharge opening in said casing for discharging the jet exhaust rearwardly from the fan jet engine out of said casing, to provide auxiliary forward thrust.

8. A turbofan jet engine thrust diverter structure as defined in claim 7, including an openable closure for closing said jet exhaust port in said jet discharge conduit, to direct said jet exhaust downwardly and augment vertical lift, means for moving said port closing means to closed position when said spherical segment shells are moved upwardly into their abutting thrust diverting positions, and moving said port-closing means to open position when said thrust diverter shell segments are moved downwardly, to permit the jet exhaust from the turbofan jet engine to pass directly rearward out of said casing through said rear fan jet discharge opening in the rear end of said casing, substantially without being downwardly diverted, to augment forward engine thrust on said structure.